US011870706B2

(12) United States Patent
Weissblat et al.

(10) Patent No.: US 11,870,706 B2
(45) Date of Patent: Jan. 9, 2024

(54) METHOD AND SYSTEM FOR ALLOCATING AND MANAGING CLOUD RESOURCES

(71) Applicant: SIMLOUD LTD, Limassol (CY)

(72) Inventors: Assaf Weissblat, Petah Tikwa (IL); Victor Apkarian, Kyiv (UA); Volodymyr Khatianovskyi, Kyiv (UA)

(73) Assignee: SIMLOUD LTD, Limassol (CY)

( * ) Notice: Subject to any disclaimer, the term of this patent is extended or adjusted under 35 U.S.C. 154(b) by 32 days.

(21) Appl. No.: 17/524,068

(22) Filed: Nov. 11, 2021

(65) Prior Publication Data

US 2022/0217097 A1 Jul. 7, 2022

Related U.S. Application Data

(60) Provisional application No. 63/125,369, filed on Dec. 14, 2020.

(51) Int. Cl.
| | |
|---|---|
| *G06F 15/173* | (2006.01) |
| *H04L 47/78* | (2022.01) |
| *H04L 47/762* | (2022.01) |
| *H04L 67/1097* | (2022.01) |
| *H04L 47/70* | (2022.01) |
| *H04L 47/80* | (2022.01) |

(52) U.S. Cl.
CPC .......... *H04L 47/781* (2013.01); *H04L 47/762* (2013.01); *H04L 47/803* (2013.01); *H04L 47/822* (2013.01); *H04L 67/1097* (2013.01)

(58) Field of Classification Search
CPC ..... H04L 67/1097; H04L 47/70; H04L 47/78; H04L 47/80; H04L 47/803; H04L 47/822
See application file for complete search history.

(56) References Cited

U.S. PATENT DOCUMENTS

| | | | |
|---|---|---|---|
| 2016/0134558 A1* | 5/2016 | Steinder ............... | G06Q 10/063 709/226 |
| 2017/0187808 A1* | 6/2017 | Redgate ................ | H04L 63/061 |
| 2017/0344618 A1* | 11/2017 | Horowitz ............ | G06F 11/2097 |

* cited by examiner

*Primary Examiner* — Yves Dalencourt
(74) *Attorney, Agent, or Firm* — Smith Temple Blaha LLC; Gregory Scott Smith

(57) ABSTRACT

A technique is disclosed for managing a virtual-cloud-deployment-group (VCDG). Some example embodiments of the disclosed technique may obtain information about a user's needs and about an application that will be executed by the VCDG. Based on this information a first version of configuration of the VCDG is defined. Then, an optimization process can be executed in order to offer an optimized VCDG.

20 Claims, 10 Drawing Sheets

METHOD AND SYSTEM FOR ALLOCATING AND MANAGING CLOUD RESOURCES

CROSS-REFERENCE TO RELATED APPLICATIONS

This utility patent application is being filed in the United States as a non-provisional application for patent under Title 35 U.S.C. § 100 et seq. and 37 C.F.R. § 1.53(b) and, claims the benefit of the prior filing date under Title 35, U.S.C. § 119(e) of the United States provisional application for patent that was filed on Dec. 14, 2020 and assigned the Ser. No. 63/125,369, which application is herein incorporated by reference in its entirety.

FIELD OF THE DISCLOSURE

The present disclosure relates to the field of utilizing cloud resources.

DESCRIPTION OF BACKGROUND ART

Currently a user who wishes to deploy an application over a cloud platform needs to have knowledge related to the cloud and its services, configurations, architecture, networking security etc. This knowledge is translated to a set of cloud services and resources. Further, the user needs to configure the services and resources, to define the connections and relations between the different resources and load a set of rules (a policy) to be used by the selected cloud resources. In addition a bank of Application Program Interface (API) has to be generated in order to control the different resources toward executing the application. Thus, the user needs to build a virtual cloud deployment group (VCDG) that fits the required application. Usually such a task may take few weeks.

An example of a cloud can be public cloud such as but not limited to Amazon Web Services (AWS) cloud. Another example of a public cloud can be Google Cloud Platform (GCP). Another cloud can be a private cloud that belongs to an organization, etc. Example of cloud resources can comprise virtual machines, Network Address Translators (NAT) gateways (GW), load balancers (LB), databases (DB), volume storage devices, Kubernets clusters, serverless functions, etc.

An example of VCDG can comprise one or more NAT GWs, one or more of virtual machines, one or more: DBs, storage volumes, load balancers, software components, $3^{rd}$ part service providers, etc. A common VCDG is designed to support a maximum utilization, which is required by a user. However, there are period of time in which the real utilization is far below the maximum-required-utilization (MRU). For some users, during the weekend or during the night, the true utilization is almost zero, for example. There are some VCDG that their utilization is dynamically changed along the day. However, the user continues to pay according to his contract and not according to the true usage of the cloud resources. Thus, during those periods the user may pay for cloud resources which are not needed.

After configuring a VCDG, a common user may wish to get an estimation of the cost of that VCDG as well as the true cost per month of that VCDG. Currently the user needs to approach the manager of the cloud in order to get the cost of each resource that is associated with the VCDG. Then the user has to calculate the cost of the VCDG taking into consideration the time dependent cost, etc. Usually the cost is changing base on the day (during the weekend the cost is less expensive), night hours may have less expensive cost than working hours, etc.

Further, there are some actions that a user may wish to execute on the VCDG as a unit. For example, the user is wishing to shut down the VCDG. Currently the user needs to execute the action on each cloud resource that is associated with that VCDG. However there are some resources that cannot be turn off by the user. For example, there are some NAT GWs that cannot be shut down.

In addition, a current VCDG has to be associate with a single cloud and even with a single region of a certain cloud. However we found that splitting the VCDG between two or more clouds of different vendors or between two or more regions of the same vendor may improve the efficiency of the VCDG and reduce the cost of preforming the application.

BRIEF SUMMARY

The needs and the deficiencies that are described above are not intended to limit the scope of the inventive concepts of the present disclosure in any manner. The needs are presented for illustration only. The disclosure is directed to a novel technique for allocating and managing cloud resources in order to perform a certain application.

In order to avoid the deficiencies of common techniques, some example embodiments of a manager of a VCDG (VCDGM) can create and manage one or more VCDGs. An example of VCDGM can be configured to control the VCDG. An example of a VCDGM can execute a plurality of instances. Each instance can be associated with a certain user and a certain application that is currently associated with that VCDG.

An example of VCDGM may comprise a plurality of engines. Engines such as but not limited to: a builder-engine that builds one or more VCDGs, Hibernate engine (HiEn), cost engine, deployment engine, etc. In addition an example VCDGM may comprise a scheduler, a human interface, a scanner of the VCDG (SoVCDG) and a cost DB (CDB).

The CDB may store the cost of a plurality of cloud resources. The CDB can be organized according to users, per each user the CDB can be divided into two or more zones. Each zone can be associated with a vendor of a cloud. In some embodiments of CDB, some zones can be divided into sub-zone. Each sub zoon can be associated with a certain region of that vendor. Some embodiment of CDB may deliver the cost of a certain resource in a certain period of time. Thus, an entry in the CDB can store the cost of a certain cloud resource, per a certain user, of a certain cloud in a certain region of that cloud during a certain period of time. Further, some example embodiment of a CDB may include cost of $3^{rd}$ party services running in the cloud and be exposed by an API.

Upon initiation of a VCDGM, an example of CDB can be generated by collecting information from the user and from one or more vendors of the different clouds. From time to time the data in the CDB can be updated according to changes in cost of the different resources.

An example of a VCDGM can be configured to build a VCDG based on the user needs taking into consideration the cost of that VCDG. Some embodiments of VCDGM may analyze the user needs and accordingly may offer a less expensive configuration of the VCDG. For example, solid state storage devices (SSD) can be replaced by of magnetic discs, which are less expensive. The number of the virtual machines in the VCDG can be adapted to the current utilization, etc. The adaptation can be done dynamically and can be modified during the day.

Other example embodiments of VCDGM may not have a CDB. Such embodiment may use a VCDG table that can store information related to the cost of each cloud resources. Such a table is disclosed below.

At the end of building a VCDG a table that defines the VCDG can be created (VCDGT). An example of a VCDGT can comprise a plurality of columns and a plurality of lines. Each line can be associated with a cloud resource that has been assigned to that VCDG. The first column can be associated with the type of the resource. The second column can be associated with the resource ID. The $3^{rd}$ column can be associated with the type of one or more APIs that can be implemented on that resource, the 4th column can be associated with the ID of the relevant VCDG, another column can store the private IP address that is allocated per that resource, the next column can store the public IP address that has been allocated per that resource for executing the current application. A following column can store the current state of the resource (active, standby, off), etc.

Some embodiments of the VCDGT may store information about the cost of each cloud resource. Such a VCDGT may comprise few sets of columns, Each set can be associated with a vendor of a cloud. Each set of columns can be divided into regions, accounts and according to time. Thus a cell in the junction of a certain line with a certain column may comprise the price of that resource in a cloud of that vendor during a certain period of time and a certain region and a certain account of that user. Embodiments of CDMs that have such a table may not need a CDB.

The modification of a VCDG can be initiated by the scheduler, every few minutes, 1 to 180 minutes, for example. A common value for a modification period can be 60 minutes, for example. In some embodiments, the scheduler may send a trigger to the scanner of the VCDGM in order to scan the load over the one or more VCDGs and to report to the VCDGM. Accordingly the VCDGM may modify the configuration of the VCDG. In some cases the user of that VCDG may send a request to modify the configuration of the VCDG. The request can be sent via the user interface. After the modification the VCDGT can be updated.

A user can control the VCDG as a single unit and let the VCDGM to process the command and implement it on each one of the associated cloud resources. Following are few examples of such commands: Turn-Off the VCDG; Place the VCDG in standby; restore from standby; estimate the cost of the VCDG, calculate the true cost (the actual cost) of the CDGM, display one or more VCDGs, etc.

An example embodiment of VCDGM can be configured to place the VCDG in a standby mode. During the first step of the standby process a snapshot of the current configuration of the VCDG can be stored in a memory device that is associated with the VCDGM. The location in the memory of the VCDGM in which the properties of each resource are stored can be written in the relevant cells of the VCDGT. Next, resources of the VCDG can be released (turn off). Turn-off the resources can be implementing by using a stop API of each resource. For example: a relational DB can be stopped by an API-stop-DB; a virtual machine 1 can be stopped by an API-stop-instance 1; etc. In addition, indication on the current state can be written in the cell at the appropriate column of the VCDGT.

Stopping some cloud resources can be done by a unique standby process. For example, storage volume can be copied from a solid-state-disc (SSD) to an hard disc, which is less expensive, and the SSD can be released (turn off). Indication on the address in the hard disc to where the SSD was copied can be written in the appropriate cells in the VCDGT. Further, modification of attribute of cloud resource may reduce the cost of the VCDG. For example, the number of allowed I/O cycles can be reduced at the vendor of that cloud. Reducing the allowed I/O cycles leads to reduce in the cost of the VCDG. Along the present disclosure and the claims the verbs delete, release and stop may be used interchangeably. Further, along the present disclosure and the claims the terms hard disc and magnetic disc may be used interchangeably.

Usually, a user purchases the opportunity to execute some operations. For example the opportunity to execute a certain number cycles of I/O per a period of time, per second for example (IOPS). Therefore, reducing this number of cycles reduces the cost of the VCDG, An example embodiment of the disclosed technique can be configured to impersonate the user in front of the vendor of the cloud in order to change the user's definitions at the vendor. Another example embodiment of the disclosed technique can be configured to get cloud access credentials on behalf of the user to modify the cloud resources that are assigned to one or more VCDG of that user. (Can be independent claim).

An example embodiment of the disclosed technique can use a unique stand by process for handling resources that do not have a shutdown API. For example, a NAT GW does not have a shutdown API. Therefore, an example of VCDGM can be configured to store the current properties of the NAT GW in a memory device that is associated with the VCDGM and then release the NAT GW. The stored properties may comprise routing tables, private and public IP addresses etc. Further, during the standby mode the VCDGM is configured to keep the public IP addresses, thus enabling the restoring of the NAT GW. The address in the memory device that stores the information from the NAT-GW can be written in the appropriate cells of the VCDGT. Cells that are in the junction of the NAT-GW line with the columns that are assigned to this information.

It will be appreciated by persons skilled in the art that the placing cloud resources in a stop state may save money. However, some vendors do not deliver a stop API, thus the disclosed technique offers a novel approach to overcome this deficiency.

Restoring of a certain VCDG from the standby mode can be initiated by the scheduler or by the user via the human interface or some real-time metric (traffic detection, for example). Upon receiving the restore command the VCDGM may fetch the snapshot of the configuration that was used before initiating the standby mode. Retrieving the snapshot is implemented from the memory device that is associated with the VCDGM. Some embodiments of the disclosed technique may fetch the VCDGT that was updated before entering the standby mode. The date that is stored in the VCDGT can be used for restoring the VCDG.

Some example embodiments of the disclosed technique may use an historical DB. The historical DB can store a plurality of VCDGTs, which were used in the past, in order to implement a machine learning algorithm to determine when to enter into standby and when to restore from standby. Further, some embodiments may modify the cloud resources in order to optimize the cost of the VCDG.

Based on the configuration and the VCDGT the relevant cloud resources can be assigned to the restored VCDG. Next, based on the VCDGT, resources that were stopped by a stop API can be resorted by a start-API. For example, a relational DB can be initiated by an API-start-DB. A virtual machine can be initiated with an API-start-instance, etc.

Storage volume can be initiated by API-modify-volume-from-hard-disc-to-SSD. In addition the number of allowed I/O cycles can be increased to the value that was used before the stand by and is stored in the memory device that associated with the VCDG. Further, data of SSD which were copied to a hard disk can be reloaded to the appropriate SSD according to the information that is stored in the VCDGT. One or more NAT-GWs can be allocated to the restored VCDG. Each NAT-GW can be loaded with the parameters that were stored during the standby process and the appropriate resources of the restored VCDG may be updated. Thus, the restored VCDG is ready to continue working as at the moment that the standby command was received.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE DRAWINGS

Exemplary embodiments of the present disclosure will be understood and appreciated more fully from the following detailed description, taken in conjunction with the drawings in which.

DETAILED DESCRIPTION OF SOME EXAMPLE OF EMBODIMENTS

Figure 1:
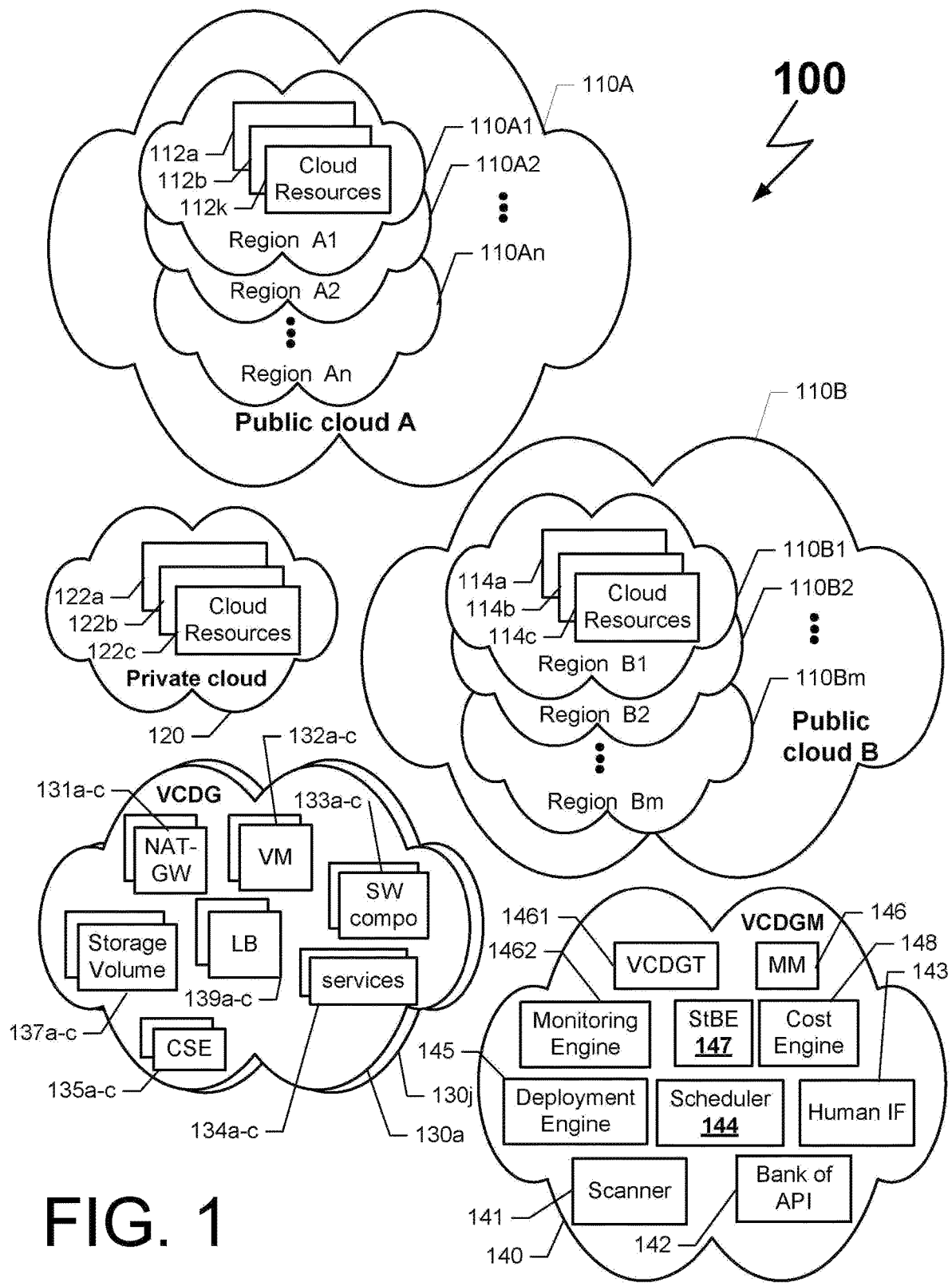
FIG. 1 illustrates a simplified block diagram with relevant elements of an example of a cloud system that operates according to the disclosed technique.

Turning now to the figures in which like numerals represent like elements throughout the several views, in which exemplary embodiments of the disclosed techniques are described. For convenience, only some elements of the same group may be labeled with numerals.

The purpose of the drawings is to describe examples of embodiments and not for production purpose. Therefore, features shown in the figures are chosen for convenience and clarity of presentation only. Moreover, the language used in this disclosure has been principally selected for readability and instructional purposes, and may not have been selected to define or limit the inventive subject matter, resort to the claims being necessary to determine such inventive subject matter.

In this specification, these implementations, or any other form that the invention may take, may be referred to as techniques. In general, the order of the steps of disclosed processes may be altered within the scope of the invention. Unless stated otherwise, a component such as a processor or a non-transitory computer readable storage device described as being configured to perform a task may be implemented as a general component that is temporarily configured to perform the task at a given time or a specific component that is manufactured to perform the task. As used herein, the term 'processor' refers to one or more cloud resources, that are configured to process data, such as computer program instructions. Some examples of processors can be virtual machines, NAT GW, load balancer, etc.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software as desired, including any combination of cloud resources, $3^{rd}$ party resources, virtual machines, API, etc.

In the following description, the words "unit," "element," "module", "cloud resource", and "logical module" may be used interchangeably. Anything designated as a unit or module or cloud resource may be a stand-alone unit or a specialized or integrated module. A unit or a module may be modular or have modular aspects allowing it to be easily removed and replaced with another similar unit or module. Each unit or module may be any one of, or any combination of, software, hardware, firmware, and/or cloud-resource, ultimately resulting in one or more processors programmed to execute the functionality ascribed to the unit or module.

Additionally, multiple modules of the same or different types may be implemented by a single processor. Software of a logical module may be embodied on a non-transitory computer readable storage device such as a read/write hard disc, CDROM, Flash memory, ROM, or other storage devices such as storage volume over a cloud, etc. In order to execute a certain task a software program may be loaded to an appropriate processor as needed. In the present disclosure the terms task, method, and process can be used interchangeably. The software of a logical module may run on a local processor or may run on a cloud virtual machine. Along the present disclosure and the claims the terms memory device, storage device and storage volume may be used interchangeably.

FIG. 1 depicts a block diagram with relevant elements of an example environment in which systems and/or methods, described herein, may be implemented. Environment 100 may comprise one or more public clouds 110A and 110B, one or more private clouds 120, one or more VCDGs 130a-j, and a VCDGM 140.

An example of a public cloud 110A and 110B can be such as but not limited to Amazon Web Services (AWS) cloud. Another example of a public cloud can be Google Cloud Platform (GCP). Some of the public clouds can be organized in regions. Public cloud A (110A) may comprise "n" regions (110A1 to 110An). Public cloud B (110B) may comprise "m" regions (110B1 to 110Bm). Each region may comprise a plurality of cloud resources (112a-k, 114a-c). The cloud resources can be such as but not limited to virtual machines 132a-c, NAT-GW 131a-c, load balancers (LB) 139a-c, databases (DB) not shown in the figures, storage-volume-devices 137a-c, bank of services 134a-c, Cyber-Security-engine (CSE) 135a-c, Kubernets clusters, serverless functions, etc.

A private-cloud 120 is a cloud that belongs to an organization. An example of a private-cloud 120 can be such as but not limited to Openstack cloud, or VMWARE cloud, for example. An example of a private-cloud 120 may offer one or more services, such as but not limited to monitoring services, cyber security services, etc.

An example of VCDGM 140 can be configured to deploy and manage one or more VCDGs 130a-c. An example of VCDGM 140 can be configured to control the one or more VCDG 130a-c by executing a plurality of instances. Each instance can be associated with a certain user and a certain application that is currently associated with that VCDG 130a-c.

An example of VCDGM 140 may comprise a plurality of engines. Engines such as but not limited to: a deployment-engine 145 that is configured to deploy one or more VCDGs 130a-c; a standby engine (StBE) 147, a cost engine 148, a scheduler 144, a human interface 143, a bank of APIs 142, a scanner 141 that scans the one or more VCDGs 130a-j. In addition an example VCDGM 140 may comprise a managing-module (MM) 146 that is associated with VCDGT 1461 and a monitoring engine 1462 and a storage volume (not shown in the figures). MM 146 can be configured to manage the operation of VCDGM 140, An example of VCDGT 1461 can comprise a plurality of columns and a plurality of lines. Each line can be associated with a cloud resource 112a to 122c that has been assigned to that VCDG 130a to 130j. The first column can be associated with the type of the resource. The second column can be associated with the resource ID. The $3^{rd}$ column can be associated with the type of one or more APIs that can be implemented on that resource, the $4^{th}$ column can be associated with the ID of the relevant VCDG 130a-j, another column can store the private IP address that is allocated per that resource, the next column can store the public IP address that has been allocated per that resource for executing the current application. A following column can store the current state of the resource (active, standby, off), etc.

Some embodiments of the VCDGT may store information about the cost of each cloud resource 112a to 122c. Such a VCDGT may comprise few sets of columns. Each set can be associated with a vendor of a cloud 110A, 110B and 120. Each set of columns can be divided into regions 110A1 to 110An, for example. In some example embodiments each set can be divided into sub-sets according to time. Further, a user that has two or more accounts may have a similar VCDGT per each account of that user. Thus a cell in the junction of a certain line with a certain column may comprise the price of that resource in a cloud of that vendor during a certain period of time and a certain region and a certain account of that user.

An example of a VCDG 130a-j may be purchased by a user who wishes to execute a certain application. Therefore, an example of VCDG 130a-j may comprise one or more cloud-resources that are required in order to execute the application. The cloud-resources may comprise network elements such as but not limited to one or more NAT-GW 131a-c, a bank of public IP addresses (not shown in the figures), one or more LB 139a-c, one or more Cyber-Security-engine (CSE) 135a-c, etc. Further, an example of VCDG 130a-j may comprise processing modules such as but not limited to VM 132a-c, software components (SWC) 133a-c, storage volume 137a-c and one or more bank of services 134a-c. Services such as but not limited to monitoring services, logging in services, etc.

An example of a VCDG 130a-j can be deployed by VCDGM 140 according to the user needs taking into consideration the cost of that VCDG 130a-j. Some embodiments of VCDGM 140 may analyze the user needs and accordingly may offer a less expensive configuration of the VCDG 130a-j. For example, storage volume 137a-c, which comprises solid state storage devices (SSD) can be replaced by storage volume 137a-c, which comprises magnetic discs. Usually storage volume 137a-c, which comprises magnetic discs are less expensive. The number of the virtual machines 132a-c in the VCDG 130a-j can be adapted to the current utilization, etc. The adaptation can be done dynamically and can be modified during the day based on indications from the scheduler 144 and the monitoring engine 1462, Some example embodiments of VCDGM 140 may comprise a machine learning module (not shown in the figures), which can be configured to learn the behavior of the user of a VCDG 130a-j and accordingly may offer the time when to switch from active mode to standby mode and vice versa. Such example embodiment may manage a storage volume in which with a plurality of records each record may store the time in which the user switch from standby to active or the time when the user switch from active to stand by. The machine learning algorithm may process this data and offer the time in which VCDGM 140 may start a standby process or restoring from standby process, respectively.

Some examples of VCDG 130a-j can comprise cloud-resources from two or more clouds of different vendors. Resources from public clouds 110A, 110B, or private cloud 120, for example. In addition some cloud resources may be delivered from different regions of a public cloud. Resources from region A1, resources 112a-112k and with resources from region An, for example. Other embodiments of VCDG 130a-j can comprise cloud-resources from different regions of different vendors. An example of VCDG 130a-j can comprise cloud-resources from region A2 110A2 with cloud resources from region B1 (110B1 for example) and region Bm 110Bm, etc. More information on the operation of VCDGM 140 and VCDG 130a-j is disclosed below in conjunction with FIG. 2 to FIG. 9.

Figure 2:
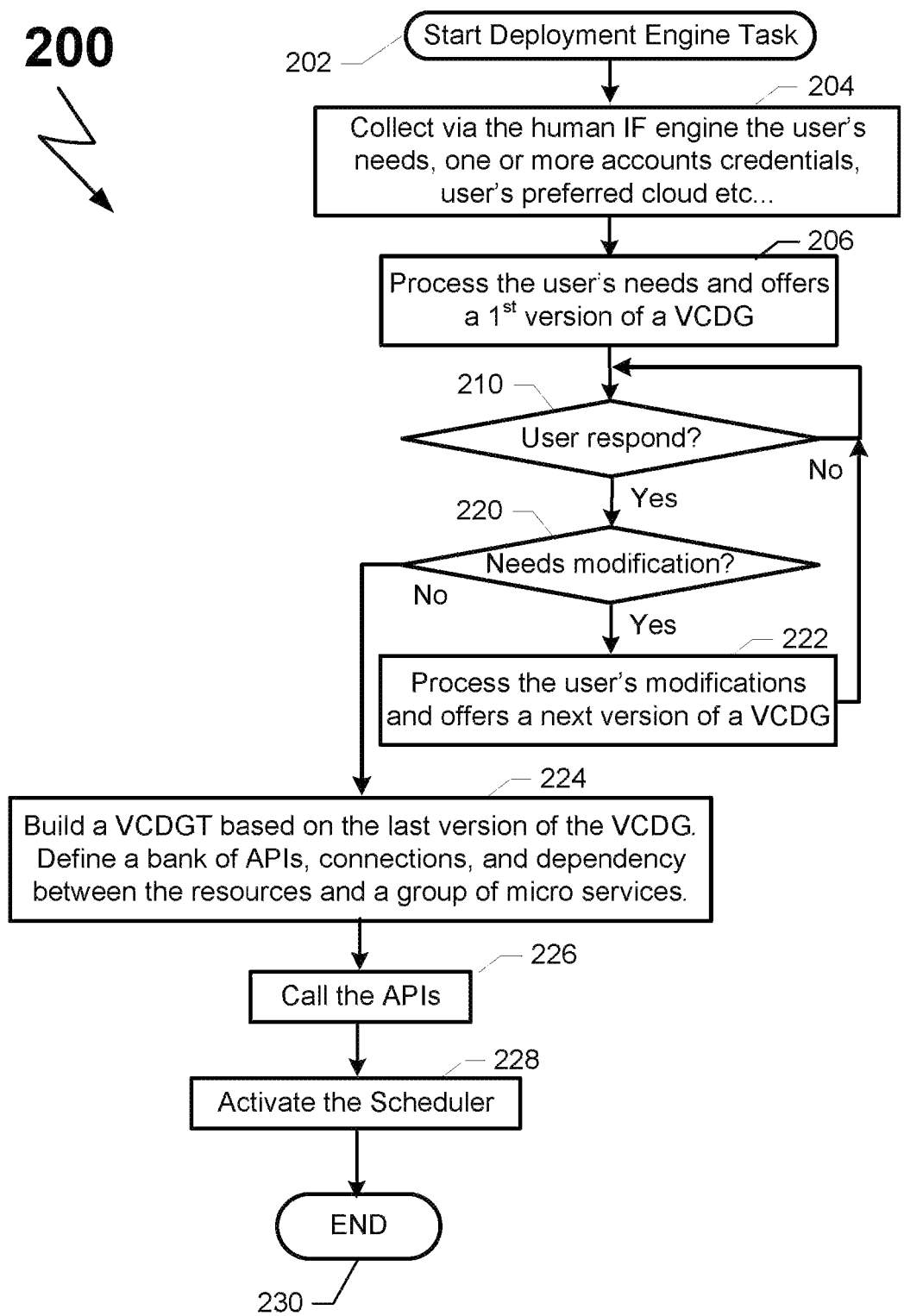
FIG. 2 schematically illustrates a flowchart showing relevant processes that can be implemented for building a VCDG by an example of a Deployment engine.

FIG. 2 schematically illustrates a flowchart 200 showing relevant processes that can be implemented by an example of deployment engine 145 (FIG. 1) for deploying a VCDG 130 (FIG. 1). The disclosed processes can be stored in a non-transitory computer readable storage device as executable instructions that when executed cause the deployment engine 145 to perform the optimization task. Process 200 can be initiated 202 by a user via the human interface 143 (FIG. 1). After initiation, process 200 may collect 204 the user needs. The needs can be network needs such as but not limited to the volume of expected traffic, cyber security services, user's preferred cloud, etc. In addition information about the user's one or more accounts credentials can be requested 204. Those credentials can be used by VCDGM 140 in order to manage the one or more VCDG 130a-j of that user.

The collected data can be processed 206 by the deployment engine 145 in order to recommend a first version of VCDG 130a-j configuration. The first version can be presented 206 to the user via the human interface 143 and process 200 may wait 210 to get the user response.

Upon getting the user response 210, the response is processed and a decision is made 220 whether a modification of the offered configuration of the VCDG is needed. If 220 yes, which means that the user ask to change one or more cloud resources, to add or remove a certain resource, to change a vendor of a certain cloud resource, etc. Then, the user modification is processed 222 and a new version of the VCDG is presented to the user and process 200 returns to block 210 and waits to the user's response.

If 220 there is no need to modify the offered version of the requested VCDG 130a-j (FIG. 1), then process 200 proceed to block 224 and build a VCDGT based on the cloud resources that belongs to the last version of the VCDG. In addition, process 200 define 224 a bank of APIs that are needed in order to control the cloud resources. Further, the connections and dependency between the different cloud resources of that VCDG can be defined as well as a set of micro services. This data is organized in the created VCDGT that is associated with that VCDG 130, as it is disclosed above in conjunction with FIG. 1.

At block 226 process 200 may call the relevant APIs and initiate the new VCDG 130a-j, then a scheduler that is associated with that VCDG can be activated 228 and process 200 can be terminated 230.

Figure 3A:
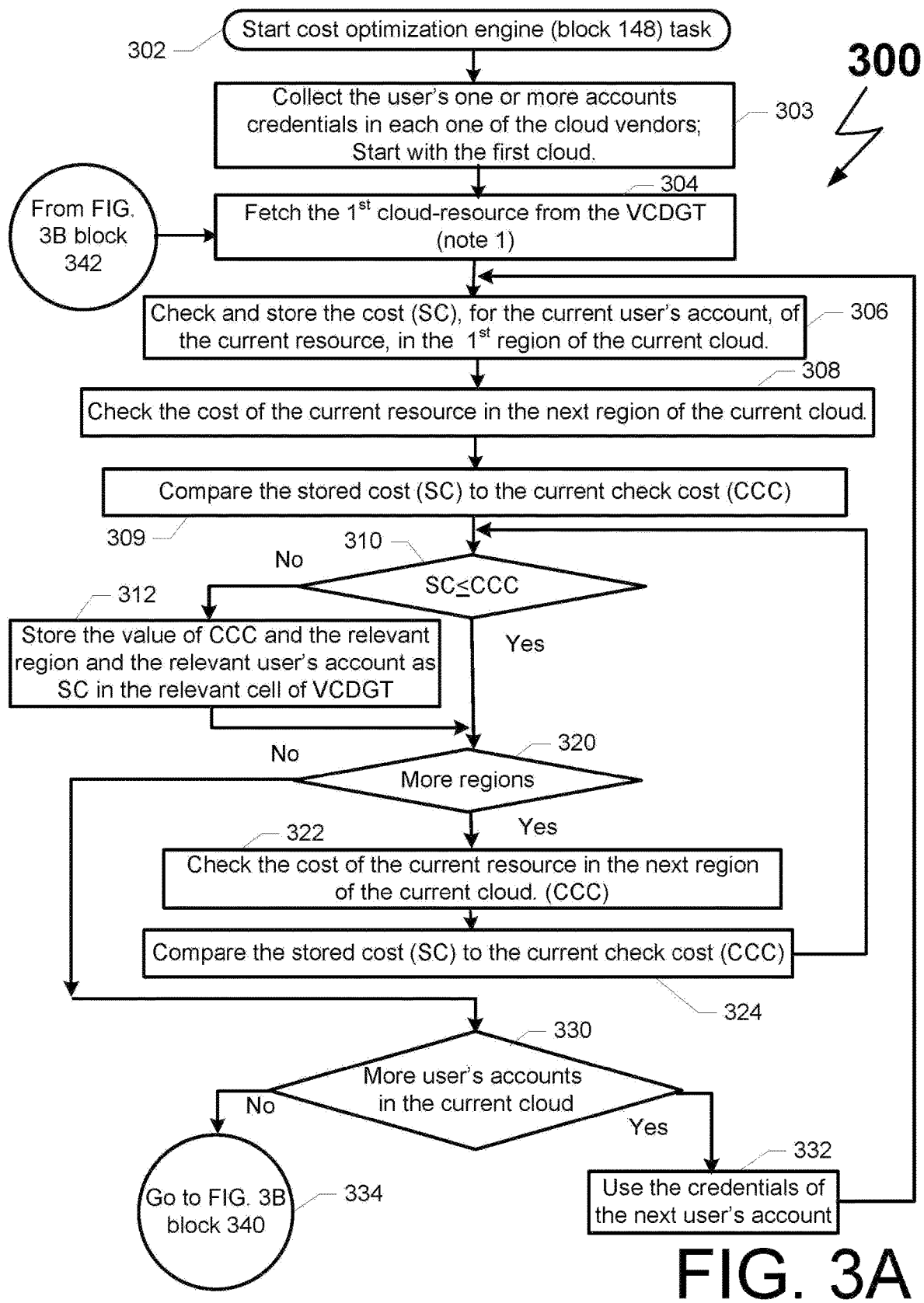
FIGS. 3A & 3B schematically illustrates a flowchart showing relevant processes that can be implemented by an example of a cost engine for optimizing the cost of a VCDG.
Figure 3B:
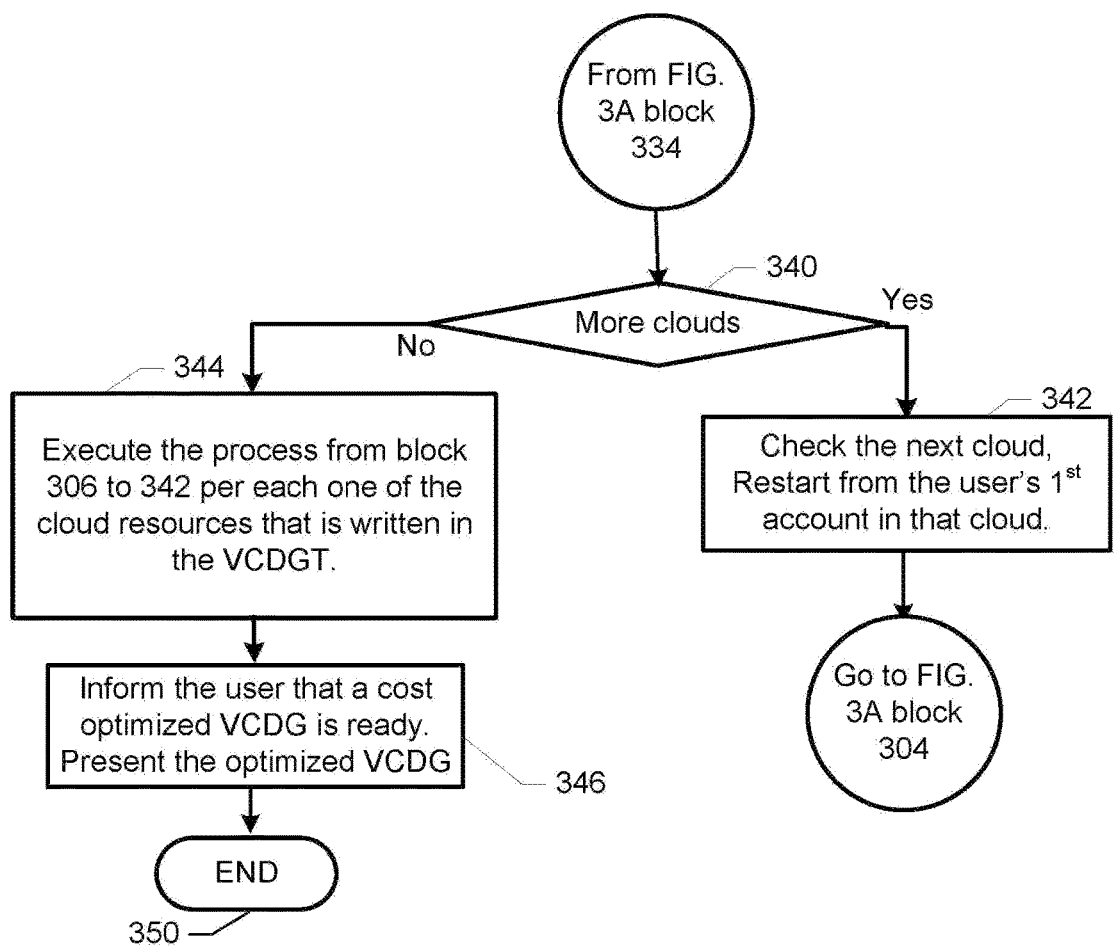

FIGS. 3A&3B schematically illustrates a flowchart 300 showing relevant processes that can be implemented by an example of cost engine 148 (FIG. 1) for optimizing the cost of a certain VCDG 130 (FIG. 1). The disclosed processes can be stored in a non-transitory computer readable storage device as executable instructions that when executed cause the cost engine 148 to perform the cost optimization task. An example of process 300 can compare prices of cloud resources in different accounts of the user, different cloud vendors and different regions of the cloud vendors in order to offer a VCDG with possible lowest cost.

Process 300 can be initiated 302 by a user via the user interface 143 or by the deployment engine 145 after deploying a new VCDG 130 (FIG. 1) or by the scheduler 144 (FIG. 1) while looking for the best cost configuration at a certain time. In some embodiments of the disclosed technique a machine learning module can be configured to initiate 302 the optimization process 300. After initiation 302 process 300 may retrieve 304 the VCDGT that is associated with the relevant VCDG and fetches 302 the first cloud resource that is written in that table. There are some cases in which a cloud resource may comprise a group of resources. For example a VM 132a-c (FIG. 1) can be a single VM having 8 CPUs (central processing units) and having storage volume of 8 Gbytes. Alternatively this VM can be comprised from two VMs each one has 4 CPUs and 4 Gbytes. In such a case process 300 may be executed per each combination of that VM.

At block 303 process 300 may collect the user's credential of each account of the user in each cloud vendor that is associated with the user starting from the first cloud. At block 304 a loop is initiated, each cycle in the loop is associated with a cloud resource that is written in the VCDGT. Next, based on the user's credential of the current account, the cost of the current cloud resource is requested 306 from the vendor of the first region of the current cloud. The responded cost can be stored 306 (in VCDGT) and be marked as stored cost (SC).

At block 308 the cost of the current cloud resource in the next region of the current cloud can be requested and be marked as the current-checked-cost (CCC). Next the stored cost (SC) can be compared 309 to the CCC and a decision is made 310 whether SC is smaller or equal to CCC. If yes, then process 300 proceeds to block 320.

If 310 SC is not smaller or equal to CCC, then at block 312 the value of CCC, the relevant cloud vendor, the relevant region, and the relevant user's account can be stored as SC in the relevant cell of VCDGT and process 300 proceed to block 320 for checking if there are more regions. If 320 no more regions, then process 300 proceeds to block 330.

If 320 there are more regions, then the cost of the current resource in the next region of the current cloud can be checked 322 and be stored as CCC. Then, the value of SC can be compared 324 to the value of CCC and process 300 may return to block 310 and determine whether SC is equal or smaller than CCC.

At block 330 a decision is made whether the user has more accounts in the current cloud. If 330 the user has more accounts, then the credential of the user in the next user's account can be fetched 332 and process 300 may return to block 306 for checking the cost of the cloud resource for the next user's account.

If 330 there are no more user's accounts in the current cloud, then at block 340 (FIG. 3B) a decision is made 340 whether there are more clouds. If 340 yes, then the next cloud can be checked 342 and process 300 may return to block 304 for handling the next cloud.

If 340 (FIG. 3B) there are no more clouds, then at block 344, then the cost engine 148 may repeat processes 306 to 342 per each cloud resource that is written in the VCDGT. After handling the last cloud resource that is written in the VCDGT, the user can be informed 346, via the human interface engine 143 (FIG. 1), that a cost-optimized-VCDG is ready and can be presented 346 to the user and process 300 can be terminated 350. The User can activate the cost-optimized-VCDG or modify it. Wherein the cost-optimized-VCDG may comprise cloud-resources related to different accounts of the user, different cloud vendors and different regions of the cloud vendors.

It will be appreciated by persons skilled in the art that the optimization process 300 can be modified in order to optimize other features of a VCDG. Some embodiment of process 300 can be modified to optimize (to minimize) the processing time of an application that is associated with a relevant VCDG 130a-j (FIG. 1). For such a case, the maximum processing time of each cloud resource can replace the cost of that resource in the cost optimization process 300. For example, block 306 can be modified to store the value of the maximum processing time of the first resource instead of the cost of that resource. Thus, SC can be replaced by maximum-processing-time (MPT).

In a similar way the term CCC can be replaced by the current-check-maximum-processing-time (CCMPT). Thus, after modifying each one of the relevant blocks of process 300, the modified process 300 can be executed in order to offer a VCDG 130a-j (FIG. 1) that is optimized to execute the relevant application in a minimum time.

Another example embodiment of process 300 can be modified in order to optimize (to maximize) the number of IOPS of an application that is associated with a relevant VCDG 130a-j (FIG. 1). For such a case, the minimum IOPS of each cloud resource can replace the cost of that resource in the cost optimization process 300. For example, block 306 can be modified to store the value of the minimum IOPS of the first resource instead of the cost of that resource. Thus, SC can be replaced by the minimum IOPS (MIOPS).

In a similar way the term CCC can be replaced by the current-check-minimum-TOPS (CCMIOPS). Further, block 310 may be modified too. In modified-block 310 a decision is made whether MIOP is bigger than CCMIOPS. Thus, after modifying each one of the relevant blocks of process 300, the modified process 300 can be executed in order to offer a VCDG 130a-j (FIG. 1) that is optimized to offer maximum IOPS while executing the relevant application.

Some embodiment of VCDGM 140 can be modified to optimize the user's satisfaction from the relevant VCDG 130a-j (FIG. 1). In such a case, per each type of a cloud resource, the scanner 141 (FIG. 1) can be configured to scan the one or more VCDGT looking for a an entry that is associated with that type of resource and can copy the user score to that type of resource of that vendor in the relevant region and the relevant user account to a cell in a user satisfaction table.

It will be appreciated by persons skilled in the art that the optimization process 300 can be modified to operate on the user's satisfaction table in order to offer a configuration of the VCDG that is associated with the highest customer satisfaction score.

It will appreciated by persons skilled in the art that the based on the disclosed information the optimization process 300 can be modified to offer a configuration of a VCDG 130a-j (FIG. 1) that has minimal downtime, etc.

Figure 4:
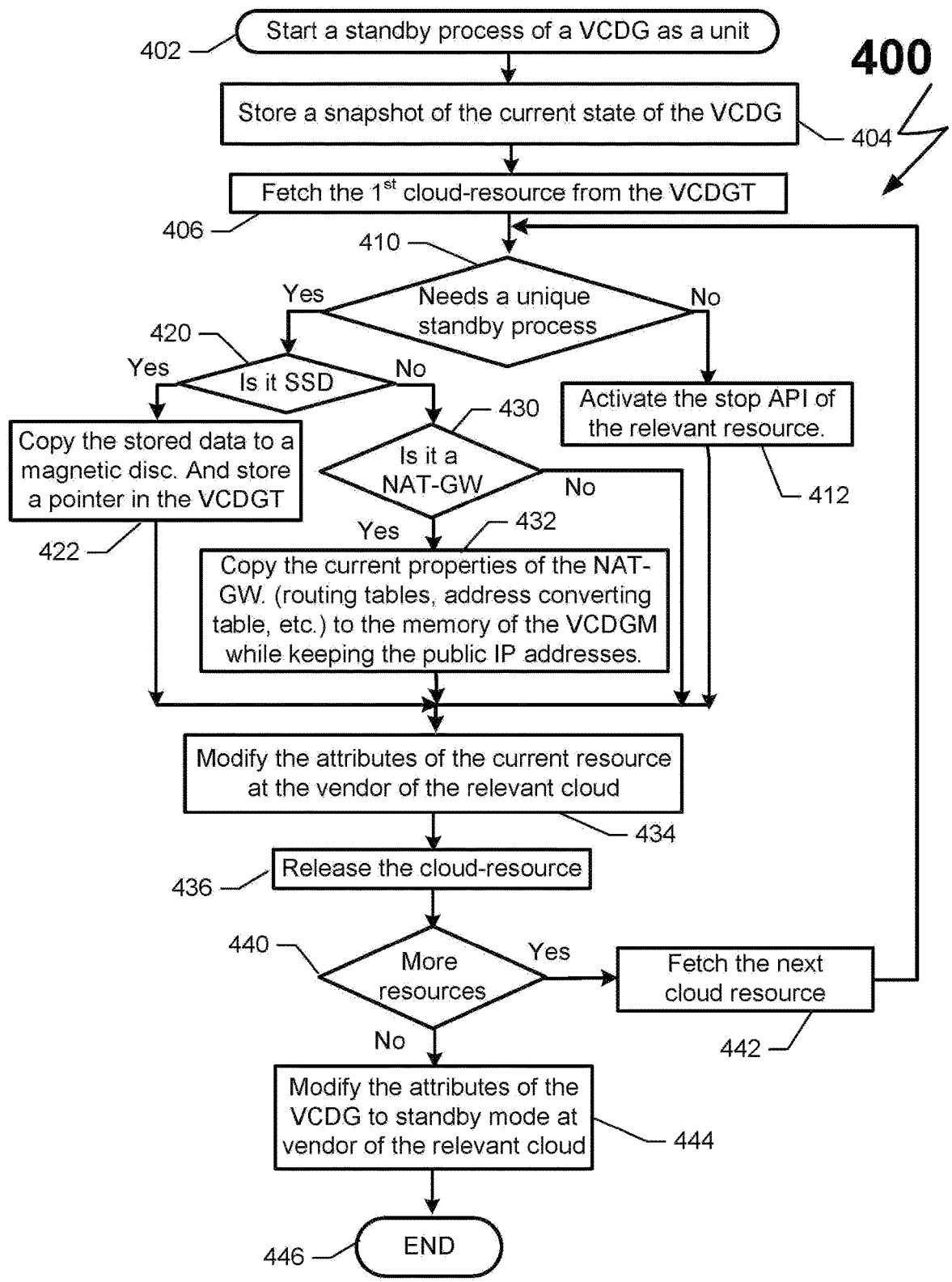
FIG. 4 schematically illustrates a flowchart showing relevant processes that can be implemented by an example of a Standby Engine (StBE} for placing a VCDG, as a unit, in a standby mode.

Referring now to FIG. 4 that schematically illustrates a flowchart showing relevant processes that can be implemented by an example of a Standby Engine (StBE} 147 (FIG. 1) for placing a VCDG 130a-j (FIG. 1) in a standby mode as one entity. The disclosed processes can be stored in a non-transitory computer readable storage device as executable instructions that when executed cause the StBE 147 to place the VCDG 130a-j in a standby mode. Process 400 can be initiated 402 by a user via the user interface 143 (FIG. 1) or by the scheduler 144 (FIG. 1) or upon determining that the relevant VCDG 130a-j used more resources than it's allocated quota. In some embodiments of the disclosed technique a machine learning module can be configured to initiated 402 the standby process 400.

After initiation 402 a snapshot of the current state of the relevant VCDG 130a-j can be stored 404 in a storage volume that is associated with the VCDGM 140 (FIG. 1). Pointers to the location, in the storage volume, of the stored data of each resource of the relevant VCDG 130a-j can be stored in the appropriate one or more cells of VCDGT 1461 (FIG. 1). The snapshot may comprise the allocated cloud resources, the connection between them, the dependency between the different cloud resources, a set of micro services, a set of APIs etc.

Next, at block 406 the first cloud resource is fetched from the VCDGT 1461 (FIG. 1) and a decision is made 410 whether the resource needs a unique standby process. The unique standby process may place the cloud resource in a virtual-standby-mode. An example of a unique process can be a process that needs to save information that is related to that resource and will be needed when the resource is reactivated. For example, data that is stored in an SSD, routing tables that are used by a NAT-GW 131a-c (FIG. 1), etc. After storing the relevant information the resource can be deleted. If 410 the resource does not need a unique standby process, then the appropriate stop API can be called 412 in order to release the resource. An API-stop-DB can be called in order to release a DB that is associated with that VCDG 130a-j. A stop-instance-API can be invoked in order to release a VM 132a-c (FIG. 1), etc. Then, process 400 may proceed to block 434.

If 410 the resource needs a unique standby process, then at block 420 a decision is made whether the resource is a SSD. If 420 it is a SSD then the stored data is copied 422 to a magnetic disc (a hard disc), for example). A pointer to the stored data, in the hard disc, is written in the appropriate cell of VCDGT 1461. If 420 the resource is not an SSD, then at block 430 a decision is made whether the resource is a NAT-GW 131a-c (FIG. 1). If 430 it is not a NAT-GW, then process 400 proceed to block 434.

If 430 resource is a NAT-GW, then the current properties of the NAT-GW 131a-c (FIG. 1) can be copied 432 to a memory of the VCDGM 140 (FIG. 1) while keeping the public IP addresses. The current properties may comprise routing tables, address converting table, bank of public IP addresses. Thus, allowing restoring of the NAT-GW 131 (FIG. 1) by using the same public IP addresses as before the standby. Pointers to the stored data can be written in the appropriate cell of the VCDGT 1461.

At block 434 the attributes of the current resource at the vendor of the relevant cloud can be modified to reflect the standby mode. Attributes such as but not limited to the number of IOPS, the number of instances of a VM 132a-c (FIG. 1), etc. Those attributes can be reduced. Next, the relevant cloud resource can be released 436 and a decision is made 440 whether there are more cloud resources in the relevant VCDG 130a-c. Thus, the disclosed process of storing properties of the cloud resource, and releasing the cloud resource can be referred as placing the cloud resource in virtual-standby-mode. If 440 there are more resources, then the next resource in the VCDGT 1461 can be fetched 442 and process 400 returns to block 410 for handling the next resource.

If 440 there are no more cloud resources, then the attribute of the VCDG at the vendor of the relevant cloud can be modified in order to reflect the standby process. Next process 400 can be terminated 446.

Figure 5:
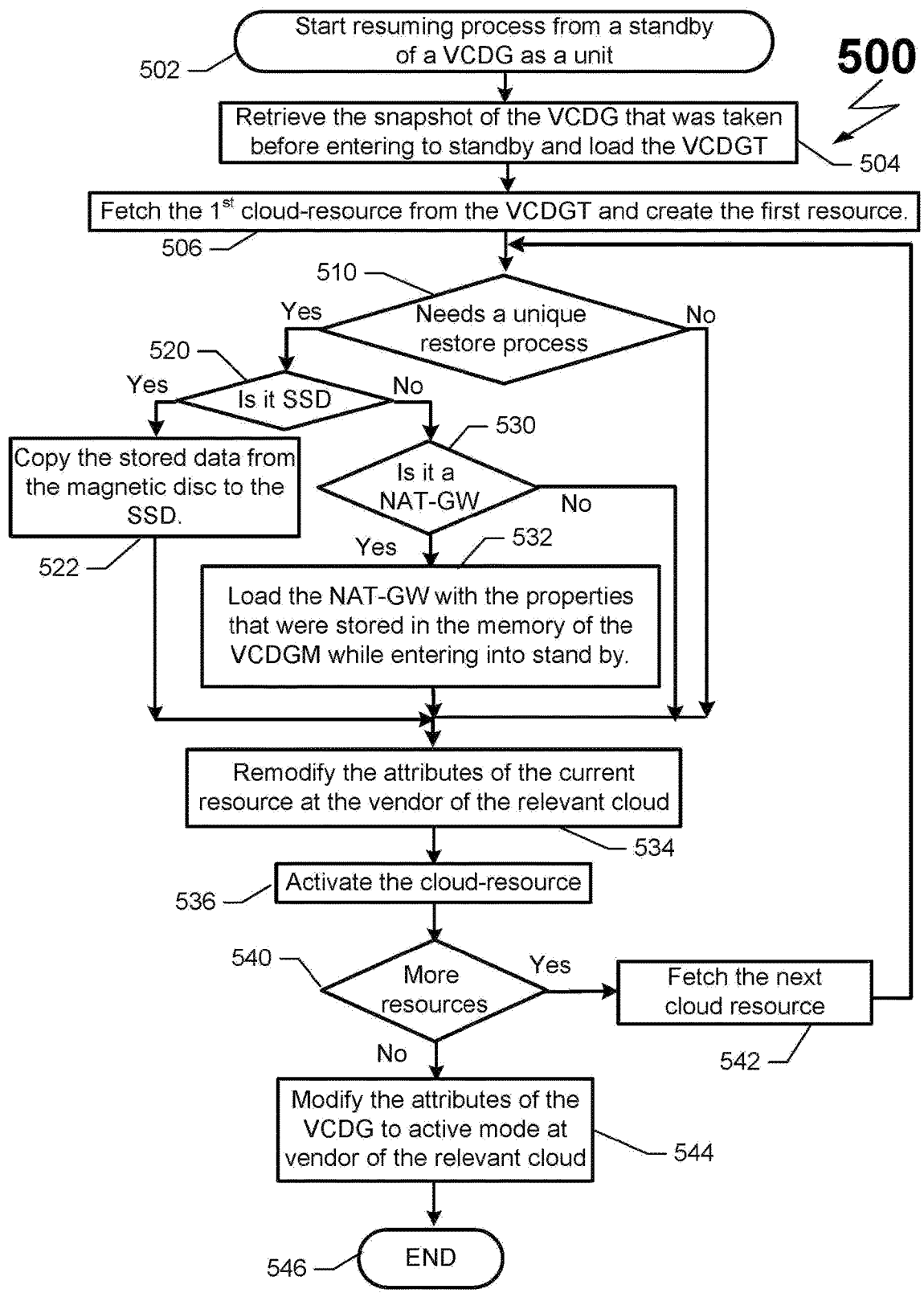
FIG. 5 schematically illustrates a flowchart showing relevant processes that can be implemented by an example of a Standby Engine for restoring a VCDG from standby mode.

FIG. 5 schematically illustrates a flowchart 500 showing relevant processes that can be implemented by an example of a Standby Engine 147 (FIG. 1) for restoring a VCDG 130a-j from standby mode. The disclosed processes can be stored in a non-transitory computer readable storage device as executable instructions that when executed cause the StBE 147 to restore the VCDG 130a-j from the standby mode. Process 500 can be initiated 502 by a user via the user interface 143 (FIG. 1) or by the scheduler 144 (FIG. 1) or upon purchasing a new quota for that relevant VCDG 130a-j. In some embodiments of the disclosed technique a machine learning module can be configured to initiate 502 the restoring process 500.

After initiation 502 the pointers to the location, in the storage volume, of the stored data of each resource of the relevant VCDG 130a-j can be retrieve 504 from the appropriate one or more cells of VCDGT 1461 (FIG. 1). Base on the pointers the snapshot that was taken before the standby can be retrieved 504 from the storage volume that is associated with the VCDGM 140 (FIG. 1). The fetched snapshot may comprise the allocated cloud resources, the connection between them, the dependency between the different cloud resources, a set of micro services, a set of APIs etc.

Next, at block 506 information about the first cloud resource is fetched from the VCDGT 1461 (FIG. 1) and the resource can be deployed. Then a decision is made 510 whether the resource needs a unique restoring process. An example of a unique process can be a process that needs to load information that is related to that resource and is needed for reactivating the resource. For example, data that was stored in an SSD before the standby, routing tables that were used by a NAT-GW 131*a-c* (FIG. 1) prior to the standby, etc. If 510 the resource does not need a unique restoring process, then process 500 may proceed to block 534.

If 510 the resource needs a unique restoring process, then at block 520 a decision is made whether the resource is a SSD. If 520 it is a SSD then, based on the pointer that is written in the VCDGT 1461, the stored data from the magnetic disc is copied 522 to the SSD by API-modify-from-hard-disc-to-SSD, for example. If 520 the resource is not an SSD, then at block 530 a decision is made whether the resource is a NAT-GW 131*a-c* (FIG. 1). If 530 it is not a NAT-GW, then process 500 proceed to block 534.

If 530 the resource is a NAT-GW, then the pointers to the stored properties of the NAT-GW 131*a-c* can be retrieved from the appropriate one or more cells of the VCDGT 1461 (FIG. 1). Based on the pointers the memory of the VCDGM 140 (FIG. 1) can be searched and the stored properties of the NAT-GW together with the stored public IP addresses can be retrieved and be loaded to the NAT-GW. The properties may comprise routing tables, address converting table, bank of public IP addresses, etc.

At block 534 the attributes of the current resource at the vendor of the relevant cloud can be modified to reflect the active mode. Attributes such as but not limited to the number of IOPS, the number of instances of a VM 132*a-c* (FIG. 1), etc. Next, the relevant cloud resource can be activated 536 by calling the relevant start-API of that resource and a decision is made 540 whether there are more cloud resources in the relevant VCDG 130*a-c*. If 540 there are more resources, then the next resource in the VCDGT 1461 can be fetched 542 and process 500 returns to block 510 for reactivating the next resource.

The relevant start-API can be such as but not limited to API-start-DB, which can be called in order to restore the DB that is associated with that VCDG 130*a-j*. Another example can be start-instance-API, which can be invoked in order to activate a VM 132*a-c* (FIG. 1), etc.

If 540 there are no more resources, then the modified attributes of the VCDG can be remodified 544 for reflecting the active mode. The number of IOPS can be increase, the quota of VM instances can be increased and so on. Then process 500 can be terminated 546.

Figure 6:
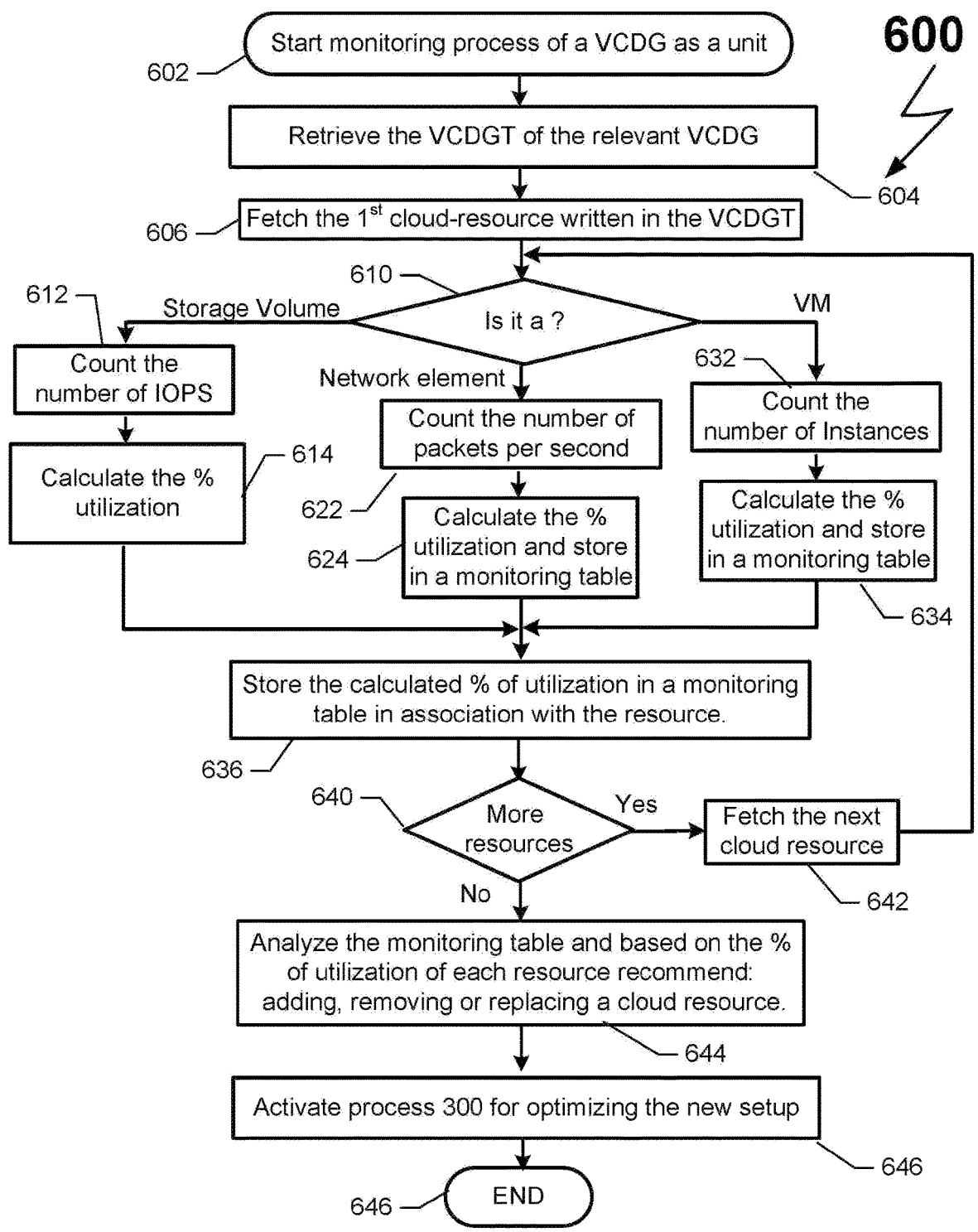
FIG. 6 schematically illustrates a flowchart showing relevant processes that can be implemented by an example of a Monitoring Engine (MoEn) for monitoring the load over a VCDG.

Referring now to FIG. 6 that schematically illustrates a flowchart showing relevant processes that can be implemented by an example of a monitoring process 600, which can be implemented by the monitoring engine 1462 (FIG. 1). The disclosed processes can be stored in a non-transitory computer readable storage device as executable instructions that when executed cause the monitoring engine 1462 to monitor the utilization the VCDG 130*a-j*.

Process 600 can be initiated 602 by a user via the user interface 143 (FIG. 1) or by the scheduler 144 (FIG. 1), for example. After initiation the VCDGT 1461 that is related to the relevant VCDG 130*a-j* can be retrieved and the first cloud resource in the table can be fetched. At block 610 a decision is made about the type of the resource. The cloud resource can be a storage volume, a network element or a VM. If 610 the cloud resource is a storage volume, then the number of IOPS can be calculated 612. Based on the attribute of that storage volume the percentage of utilization of that storage volume can be calculated 614.

The calculated percentage can be stored 636 in a monitoring table in line that is associated with that resource. Alternatively, the percentage of utilization can be written in the relevant cell in the VCDGT 1461. The cell in the line that is associated to that cloud resource. Then, a decision is made 640 whether there are more cloud resources in the VCDGT 1461. If 640 yes, then the next resource is retrieved 642 from the VCDGT 1461 and process 600 returns to block 610 for monitoring the next resource.

Returning now to block 610, If the cloud resource is a network element, then the number of passing packets or bytes per second can be calculated 622. Based on the characteristic of that network element the percentage of utilization of that element can be calculated 624 and process 600 proceeds to block 636. If 610 the cloud resource is a VM 132*a-c* (FIG. 1), then the number of instances can be calculated 632. Based on the characteristic of that VM the percentage of utilization of that VM can be calculated 634 and process 600 proceeds to block 636.

If 640 there are no more cloud resources, then the monitoring table can be analyzed 644 and based on the percentages of utilization of each cloud resource process 600 may recommend 644 adding an additional resource, removing a resource or modifying a certain resource. If, for example, the utilization of a SSD is above 80%, then process 600 may recommend adding more storage volume. If the number of IOPS is small than a certain threshold, then process 600 may recommend replacing a SSD storage volume with a magnetic disc storage volume, etc.

After changing 644 the configuration of the VCDG 130*a-j* (FIG. 1) process 300 can be initiated 646 in order to optimize the new configuration of the VCDG 130*a-j* (FIG. 1) and process 600 can be terminated 646.

Figure 7:
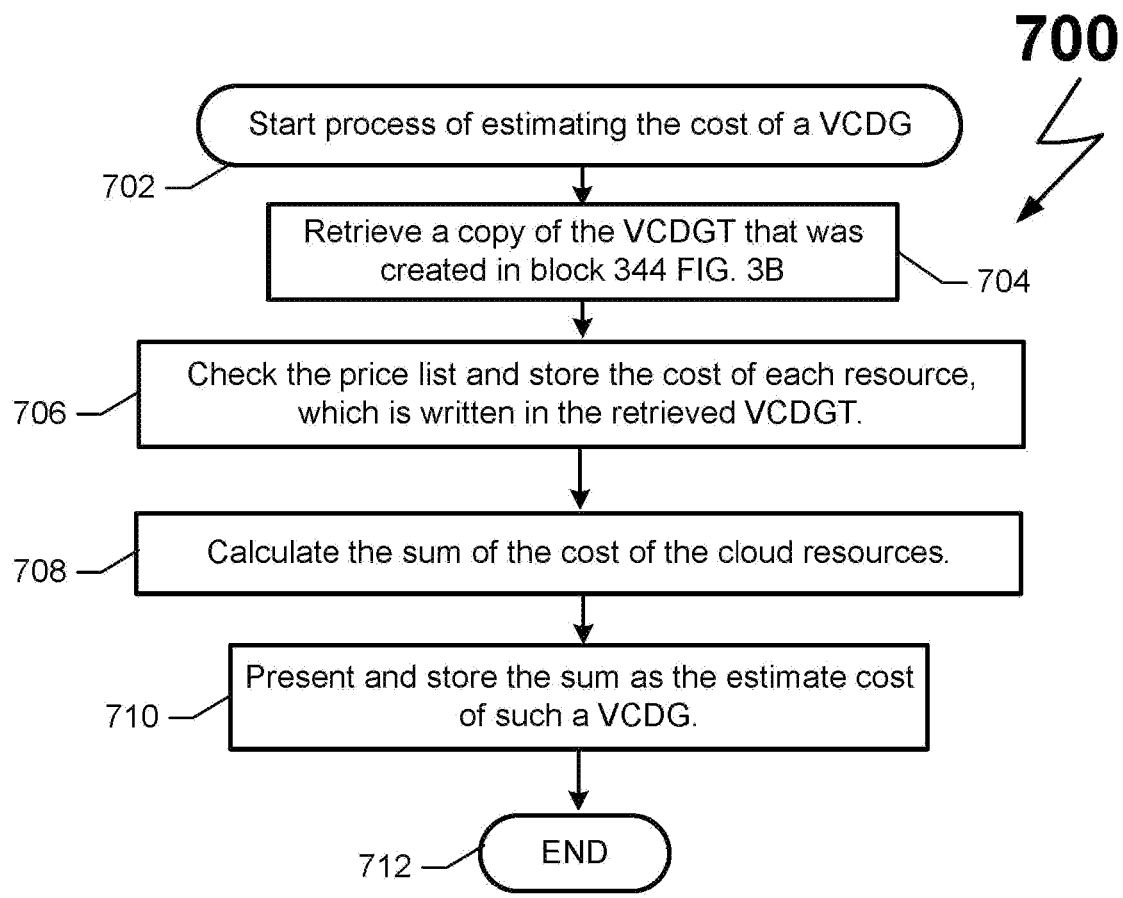
FIG. 7 schematically illustrates a flowchart showing relevant processes that can be implemented by an example of a cost engine for estimating a cost of a VCDG.

FIG. 7 schematically illustrates a flowchart 700 showing relevant processes that can be implemented by an example of a cost engine 148 (FIG. 1) for estimating the cost of a VCDG 130*a-c*. The disclosed processes can be stored in a non-transitory computer readable storage device as executable instructions that when executed cause the cost engine 148 for estimating the cost of a VCDG 130*a-c*. Process 700 can be initiated 702 by a user, via the human interface 143 (FIG. 1), who wishes to estimate the cost of a VCDG. After initiation process 700 may retrieve 704 a copy of the VCDGT 1461 (FIG. 1) that is related to that VCDG 130*a-c* and was generated at block 344 (FIG. 3).

Next, the cost of each cloud resource can be retrieved from a price list of the cloud vendor and be written 706 in the appropriate cell of VCDGT 1461. At block 708 the sum of the cost of the resources can be calculated and the total cost can be stored 710 in the VCDGT 1461 and be presented 710 to the user, via human IF 143, as the estimate cost of such a VCDG and process 700 can be terminated 712.

Figure 8:
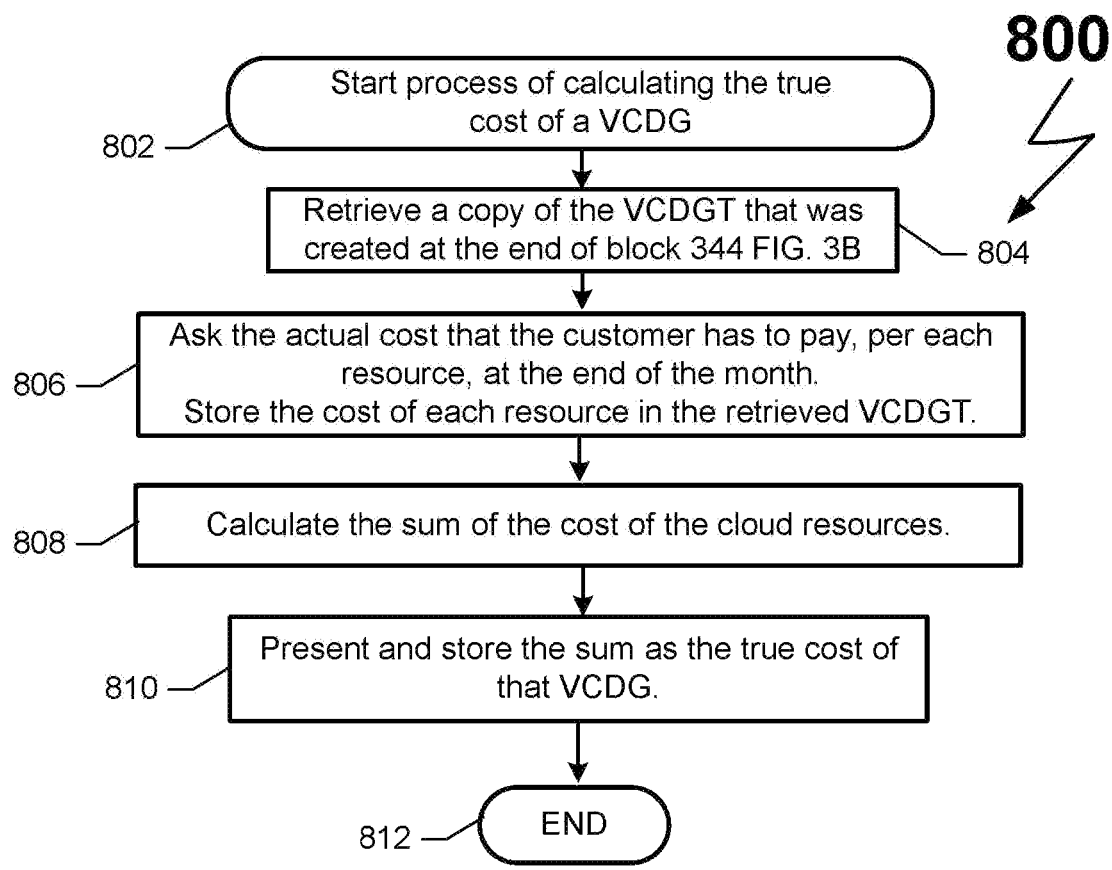
FIG. 8 schematically illustrates a flowchart showing relevant processes that can be implemented by an example of a cost engine for calculating the true cost of a VCDG.

Referring now to FIG. 8 that schematically illustrates a flowchart showing relevant processes that can be implemented by an example of a process 800, which can be implemented by an example of a cost engine 148 (FIG. 1) for calculating the true cost of a VCDG 130*a-c*. The disclosed processes can be stored in a non-transitory computer readable storage device as executable instructions that when executed cause the cost engine 148 for calculate the true cost of the VCDG 130*a-c*. Process 800 can be initiated 802 by a user, via the human interface 143 (FIG. 1), who wishes to know the true cost of a certain VCDG.

After initiation process 800 may retrieve 804 a copy of the VCDGT 1461 (FIG. 1) that is related to that VCDG 130a-c and was generated at block 344 (FIG. 3). Next, the actual cost, to be paid at the end of the month, for that user account, of each cloud resource can be requested 806 from the cloud vendor of that resource and be written 806 in the appropriate cell of VCDGT 1461. The actual cost may reflect the user's account, the cloud vendor and the cloud region that is related to the current resource as well as the attributes of that resource. At block 808 the sum of the actual cost of the resources can be calculated and the total actual cost can be stored 810 in the VCDGT 1461 and be presented 810 to the user, via human IF 143, as the true cost of that VCDG at that time. This cost can be change from time to time. Then, process 800 can be terminated 812.

Figure 9:
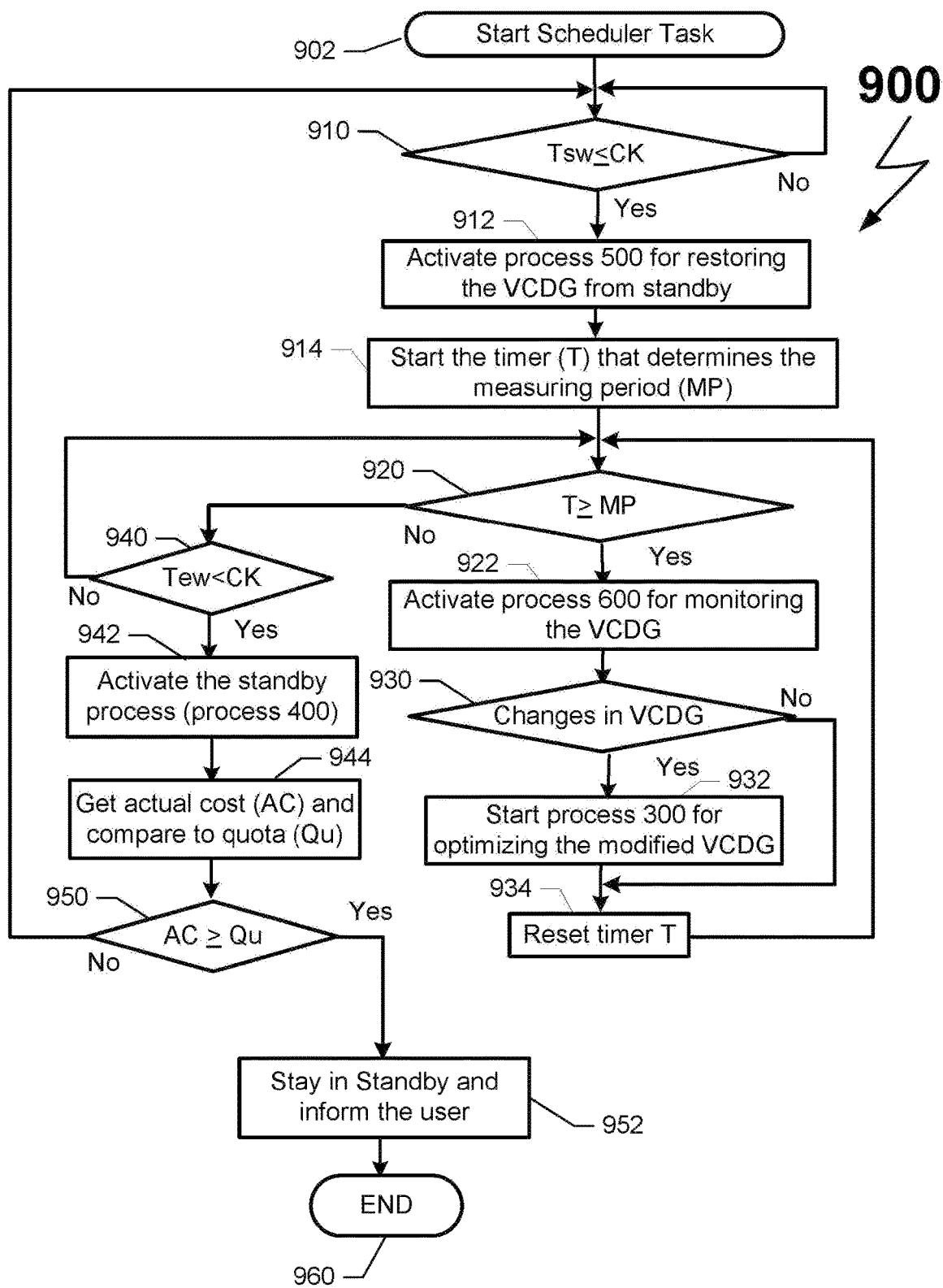
FIG. 9 schematically illustrates a flowchart showing relevant processes that can be implemented by an example of a Scheduler.

FIG. 9 schematically illustrates a flowchart 900 showing relevant processes that can be implemented by an example of a Scheduler 144 (FIG. 1). The disclosed processes can be stored in a non-transitory computer readable storage device as executable instructions that when executed cause the Scheduler 144 for scheduling the modes of operation of the VCDGM 140. Scheduler 144 can be initiated 902 upon starting the operation of VCDGM 140 and may run as long as VCDGM 140 is active. Upon initiation a clock of VCDGM 140 can be synchronized with the local clock. In addition two parameters may be loaded. The first parameter is the start-working-time (Tsw), the time in which the VCDG 130a-j that is associated with VCDGM 140 starts working. The Second parameter is end-working-time (Tew). Tew is the time in which the VCDG 130a-j that is associated with VCDGM 140 stops working and moves into standby mode. Usually Tew is at the end of the day. The two parameters, Tsw and Tew can be stored in the VCDGT 1461. An example value of Tsw can be 08:00, a example value of Tew can be 17:30.

After initiation, at block 910 a decision is made whether the clock is equal or greater than Tsw. If 910 no, then process 900 may wait until the clock will be equal or greater than Tsw, then at block 912 process 500 for restoring from standby mode can be activated for restoring the cloud resources of VCDG 130a-j. At block 914 a timer T that measure the monitoring period (MP) can be initiated and runs in a cyclic mode sending a trigger every MP minutes. The value of MP can be in the range of few tens of minutes, an example value of MP can be 60 minutes.

Next a decision is made 920 whether T is equal or greater than MP. If 920 yes, then process 600 for monitoring the activity of the relevant VCDG can be activated 922. At the end of the monitoring process a decision is made 930 whether the monitoring process modified the configuration of the relevant VCDG 130a-j. If 930 no, then timer T can be reset 934 and process 900 returns to block 920 and starts measuring the time to the next MP.

If 930 the monitoring process changes the configuration of the relevant VCDG 130a-j, then process 300 for optimizing the new configuration can be initiated 932. At the end of the optimizing process 934 timer T can be reset and process 900 may return to block 920 and starts measuring the time to the next MP.

Returning now to block 920, if T is not equal or greater than MP, then a decision is made 940 whether the clock is greater than Tew' the time of end working. If 940 no, process 900 returns to block 920. If 940 the clock is greater than the value of Tew, then the standby process (process 400) can be initiated 942 in order to place the VCDG in standby mode.

At block 942 process 900, by using the user's credential, may apply 944 to one or more vendors of the resources of the VCDG 130a-j (FIG. 1) requesting for the current actual cost of the resources of that VCDG. The obtained actual cost can be summed together and the total cost can be compared to the purchased quota. If 950 the actual cost is greater than the quota, then the VCDG may remain in standby 952 and a message can be sent to the user via the human IF 143 (FIG. 1). Then process 900 can be terminated 960. If 950 the actual cost is not greater than the quota, then process 900 may return to block 910 waiting to the start working (Tsw) hour.

In the description and claims of the present disclosure, each of the verbs, "comprise", "include", "have", and conjugates thereof, are used to indicate that the object or objects of the verb are not necessarily a complete listing of members, components, elements, or parts of the subject or subjects of the verb.

The present disclosure has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A non-transitory computer readable storage device comprising executable instructions that when executed cause a processor at a manager of a virtual-cloud-deployment-group (VCDG) to:
obtain information about a user needs and about an application that will be executed by the VCDG;
define a first version of configuration of the VCDG;
execute an optimization process by iteratively:
presenting the VCDG to the user;
receiving modifications from the user;
incorporating the modifications into a modified VCDG;
repeating until the user accepts the modified VCDG as an optimized VCDG;
wherein the optimized VCDG comprises: a first-cloud-resource that is associated with a first cloud in a first region and, a second-cloud-resource that is associated with a second cloud in a second region.

2. The non-transitory computer readable storage device of claim 1, wherein the first cloud belongs to a first vendor and the second cloud belongs to a second vendor.

3. The non-transitory computer readable storage device of claim 1, wherein the optimization process is executing over two or more user's accounts.

4. The non-transitory computer readable storage device of claim 1, wherein the optimized VCDG is cost optimized.

5. The non-transitory computer readable storage device of claim 1, wherein the optimization process optimize the time that VCDG execute the application.

6. The non-transitory computer readable storage device of claim 1, further comprising executable instructions that when executed cause a processor at a manager of a virtual-cloud-deployment-group (VCDG) to:
obtain a command related to the VCDG as one entity;

convert the command to a plurality of related-processes, wherein each related-process is related to a type of a cloud resource that is associated with that VCDG; and
execute on each one of the cloud-resources, which is associated with the VCDG, its related-process.

7. The non-transitory computer readable storage device of claim 6, wherein the obtained command is to place the VCDG in standby mode.

8. The non-transitory computer readable storage device of claim 7, further comprising store a snapshot of the current state of the VCDG.

9. The non-transitory computer readable storage device of claim 7, wherein the VCDG comprises a NAT-GW then the related process comprising:
copying current properties of the NAT-GW to a storage volume;
keeping public IP addresses that are assigned to the VCDG; and
storing pointers to the stored properties of the NAT-GW and the stored public IP addresses.

10. The non-transitory computer readable storage device of claim 7, wherein the VCDG comprises a solid state storage device (SSD) then the related process comprising:
copying current content of the SSD to a magnetic storage volume; and
storing pointers to the stored data of the SSD.

11. The non-transitory computer readable storage device of claim 1, further comprising executable instructions that when executed cause a processor at a manager of a virtual-cloud-deployment-group (VCDG) to:
obtain a request from a user to estimate a cost of a VCDG;
estimate the cost of the VCDG; and
present the estimated cost to the user.

12. The non-transitory computer readable storage device of claim 1, further comprising executable instructions that when executed cause a processor at a manager of a virtual-cloud-deployment-group (VCDG) to:
obtain a request from a user to calculate a true cost of a VCDG;
obtain an actual cost per each resource of the VCDG;
calculate the sum of the actual cost of each resource as a true cost of the VCDG; and
present the true cost to the user.

13. The non-transitory computer readable storage device of claim 7, further comprising executable instructions that when executed cause a processor at a manager of a virtual-cloud-deployment-group (VCDG) to, in response to obtaining the request from a user to place a VCDG in standby mode:
store a snapshot of a current state of the VCDG; and
release one or more cloud resources of the VCDG.

14. A non-transitory computer readable storage device of claim 1, further comprising executable instructions that when executed cause a processor at a manager of a virtual-cloud-deployment-group (VCDG) to:
obtain a request to monitor, when the VCDG is active, a utilization of one or more cloud resources; and
calculate percentage of the utilization of each resource from the one or more cloud resources.

15. The non-transitory computer readable storage device of claim 14, wherein the utilization of the first-cloud-resource is above a first threshold then an additional similar cloud resource is added to the VCDG.

16. The non-transitory computer readable storage device of claim 14, wherein the utilization of the second-cloud-resource is below a second threshold then the second cloud resource is replaced by a less expensive resource.

17. The non-transitory computer readable storage device of claim 13, wherein the request from a user to place a VCDG in standby mode is as one entity, further comprising executable instructions that when executed cause a processor at a manager of a virtual-cloud-deployment-group (VCDG) to:
place a first-cloud-resource, of that VCDG, in a virtual-standby-mode.

18. The non-transitory computer readable storage device of claim 17, wherein the instructions to place the first-cloud-resource in a virtual-standby-mode comprises instructions that when executed cause the processor at the manager of the VCDG to:
copy current properties of the first-cloud-resource to a storage volume;
storing pointers to the stored properties of the cloud resource; and
release the first-cloud-resource.

19. The non-transitory computer readable storage device of claim 7, wherein the first cloud resource is a NAT-GW and the executable instructions further comprising:
copying current properties of the NAT-GW to a storage volume;
keeping the public IP addresses that are assigned to the VCDG;
storing pointers to the stored properties of the NAT-GW and the stored public IP addresses; and
releasing the NAT-GW.

20. The non-transitory computer readable storage device of claim 7, wherein the first-cloud-resource is a solid state storage device (SSD) and the executable instructions further comprising:
copying current content of the SSD to a hard disc;
storing pointers to the stored data of the SSD; and
releasing the SSD.

* * * * *